(12) United States Patent
Hanson

(10) Patent No.: US 9,979,493 B2
(45) Date of Patent: May 22, 2018

(54) DIFFERENTIAL SIGNAL TRANSMISSION

(71) Applicant: CommScope Technologies LLC, Hickory, NC (US)

(72) Inventor: Van E. Hanson, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

(21) Appl. No.: 15/450,522

(22) Filed: Mar. 6, 2017

(65) Prior Publication Data

US 2017/0180060 A1    Jun. 22, 2017

Related U.S. Application Data

(63) Continuation of application No. 14/693,199, filed on Apr. 22, 2015, now Pat. No. 9,602,223, which is a continuation of application No. 13/869,304, filed on Apr. 24, 2013, now Pat. No. 9,042,462.

(51) Int. Cl.

| H04B 14/06 | (2006.01) |
|---|---|
| H04B 14/04 | (2006.01) |
| H04W 88/08 | (2009.01) |
| H04H 20/69 | (2008.01) |
| H04H 20/06 | (2008.01) |
| H04H 20/26 | (2008.01) |
| H04H 60/13 | (2008.01) |

(52) U.S. Cl.
CPC ......... H04B 14/066 (2013.01); H04B 14/046 (2013.01); *H04H 20/06* (2013.01); *H04H 20/26* (2013.01); *H04H 20/69* (2013.01); *H04H 60/13* (2013.01); *H04W 88/085* (2013.01)

(58) Field of Classification Search
CPC ........ H04H 20/26; H04H 60/13; H04H 20/06; H04H 20/69; H04H 20/71; H04H 40/18; H04L 1/0041; H04L 1/0045; H04L 27/22; H04N 21/6118; H04N 7/22
USPC .................................. 375/245; 348/572, 726
See application file for complete search history.

(56) References Cited

U.S. PATENT DOCUMENTS

| 3,723,879 A | 3/1973 | Kaul et al. |
|---|---|---|
| 4,270,025 A | 5/1981 | Alsup et al. |
| 4,509,150 A | 4/1985 | Davis |
| 5,416,779 A | 5/1995 | Barnes et al. |
| 6,044,162 A | 3/2000 | Mead et al. |
| 8,174,428 B2 | 5/2012 | Wegener |
| 2010/0278530 A1 | 11/2010 | Kummetz et al. |

(Continued)

FOREIGN PATENT DOCUMENTS

WO    2014176030    10/2014

OTHER PUBLICATIONS

U.S. Patent Office, "Notice of Allowance", "from U.S. Appl. No. 13/869,304", dated Jan. 23, 2015, pp. 1-10, Published in: US.

(Continued)

*Primary Examiner* — Leila Malek
(74) *Attorney, Agent, or Firm* — Fogg & Powers LLC

(57) ABSTRACT

Transport of differential signals is provided. In one aspect, a telecommunications system includes a first unit and a second unit. The first unit can calculate a differential signal from an original signal. The differential signal can represent a change in signal levels between constant time intervals in the original signal. The second unit can estimate the original signal from the differential signal received from the first unit over a communication medium.

16 Claims, 6 Drawing Sheets

(56) References Cited

U.S. PATENT DOCUMENTS

| | | |
|---|---|---|
| 2010/0331689 A1 | 12/2010 | Wegener |
| 2010/0332223 A1 | 12/2010 | Morii et al. |
| 2012/0014421 A1 | 1/2012 | Wegener |
| 2013/0003714 A1 | 1/2013 | Cannon et al. |
| 2013/0191877 A1* | 7/2013 | Rakib ................ H04N 21/6118 725/129 |
| 2014/0321562 A1 | 10/2014 | Hanson |

OTHER PUBLICATIONS

U.S. Patent Office, "Office Action", "from U.S. Appl. No. 13/869,304", dated Aug. 4, 2014, pp. 1-20, Published in: US.
U.S. Patent Office, "Advisory Action", "from U.S. Appl. No. 14/693,199", dated Jul. 6, 2016, pp. 1-6, Published in: US.
U.S. Patent Office, "Final Office Action", "from U.S. Appl. No. 14/693,199", dated Apr. 8, 2016, pp. 1-13, Published in: US.
U.S. Patent Office, "Notice of Allowance", "from U.S. Appl. No. 14/693,199", dated Nov. 3, 2016, pp. 1-8, Published in: US.
U.S. Patent Office, "Office Action", "from U.S. Appl. No. 14/693,199", dated Oct. 5, 2015, pp. 1-12, Published in: US.
International Search Authority, "International Search Report and Written Opinion for PCT Application No. PCT/US2014/033439", "from Foreign Counterpart to U.S. Appl. No. 13/869,304", dated Aug. 21, 2014, pp. 1-12, Published in: WO.

* cited by examiner

DIFFERENTIAL SIGNAL TRANSMISSION

CROSS-REFERENCE TO RELATED APPLICATIONS

This application is a continuation of U.S. patent application Ser. No. 14/693,199, titled "DIFFERENTIAL SIGNAL TRANSMISSION" and filed on Apr. 22, 2015, which is a continuation of U.S. patent application Ser. No. 13/869,304, titled "DIFFERENTIAL SIGNAL TRANSMISSION" and filed Apr. 24, 2013, the entirety of which are each hereby incorporated by reference herein.

TECHNICAL FIELD

The present application relates generally to telecommunications and, more particularly (although not necessarily exclusively), to transmission of differential signals in telecommunications distribution systems.

BACKGROUND

Telecommunications systems can include transmitting signals that include or represent information from one location to another location by a communication medium. Most types of communication mediums have a finite bandwidth. Systems and methods are needed to use the bandwidth of communication mediums more efficiently.

SUMMARY

In one aspect, a telecommunications system includes a first unit and a second unit. The first unit can calculate a differential signal from an original signal. The differential signal can represent a change in signal levels between constant time intervals in the original signal. The second unit can estimate the original signal from the differential signal received from the first unit over a communication medium.

In another aspect, a telecommunications system includes a first unit and a second unit. The first unit can calculate a differential signal from an original signal that is a zero-mean signal. The differential signal can represent a change in signal levels between constant time intervals in the original signal. The second unit can estimate the original signal from the differential signal received from the first unit over a communication medium without receiving the original signal.

In another aspect, a telecommunications system includes a first unit, a second unit, and a third unit. The first unit can calculate a first differential signal from a first original signal. The second unit can calculate a second differential signal from a second original signal. The third unit can estimate a sum of the first original signal and the second original signal from the first differential signal and the second differential signal received over at least one communication medium from the first unit and the second unit.

The details of one or more aspects and examples are set forth in the accompanying drawings and the description below. Other features and aspects will become apparent from the description, the drawings, and the claims.

DETAILED DESCRIPTION

Figure 1:
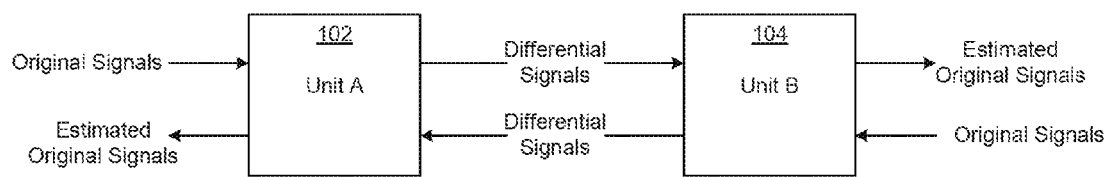
FIG. 1 is a block diagram of a telecommunications system for transporting differential signals according to one example.

Certain aspects and examples of the present invention are directed to a telecommunications system that can transport differential signals between units. A differential signal can include changes in signal levels between constant time intervals, rather than the signal itself. At a receiving end, an estimate of the original signal can be recreated if the original signal is a zero-mean signal. Although described herein with respect to the digital domain, differential signals can be determined from analog signals and transported. By sending the change in signal level rather than the signal itself, the information can be transported using fewer bits on average than if the signal itself was sent.

For example, if the digitized values of an analog signal are 258-267-285-277, then at least nine bits (ten if the negative of these values of the same range could be present) can be used to represent the signal in digital form. If the differential values are sent, 9-18-(-8), then only six bits may be needed to represent the change in signal level and allow the information to be transported. The difference in magnitude between the actual signals and the differential signals may be larger or smaller than this example, and can vary depending on the characteristics of the quantized signals.

A system in which differential signals are transported can use adaptive quantization to reduce the required bandwidth to transmit a signal. For example, if most of the time a twelve-bit signal can be adequately represented by an eight-bit differential signal, then the quantizing levels can be increased during the time when large difference signals are received to keep within the allowed eight bits. The change in quantization can be transported to the receiving end, allowing an estimate of the signal to be created with minimal distortion. In addition, uplink signal levels may be very small such that using a differential signal transport can permit greater resolution at small signal level. Furthermore, the quantizing levels can be adapted depending on the range of the signals being processed, so performance is optimized at different signal levels.

In some examples, differential signals can be transported in a distributed antenna system (DAS). A DAS can be used to transport signals that include call information between base stations, which are connected to a master unit, and remote antenna units. The signals can be transported between master units and remote antenna units in digital form or in analog form. The signals transported between a master unit and a remote antenna unit can be differential signals that represent the change in signal level between constant time intervals.

In some aspects, differential signals can be summed and the original sum of the signals can be estimated. Estimated signals can be created using prior knowledge about the statistics of the original signals and sums, but the prior knowledge may not be transmitted from the signal source location to the signal sum location. In some aspects, the calculation of the estimated signals of the sums can be dependent on prior differential signal samples and/or future differential signal samples. Actual summation may only depend on current samples.

FIG. 1 depicts an example of a telecommunications system that includes two units: unit A 102 and unit B 104. Differential signals can be transported between unit A 102 and unit B 104 over a communication medium. Examples of communication mediums include coaxial or other electrical cable, optical fiber, and wireless communication mediums. Differential signals can include changes in signal levels between constant time intervals of original signals that are not transported between unit A 102 and unit B 104. Each of unit A 102 and unit B 104 can estimate the original signals that are not transported between unit A 102 and unit B 104 from the differential signals.

Figure 2:
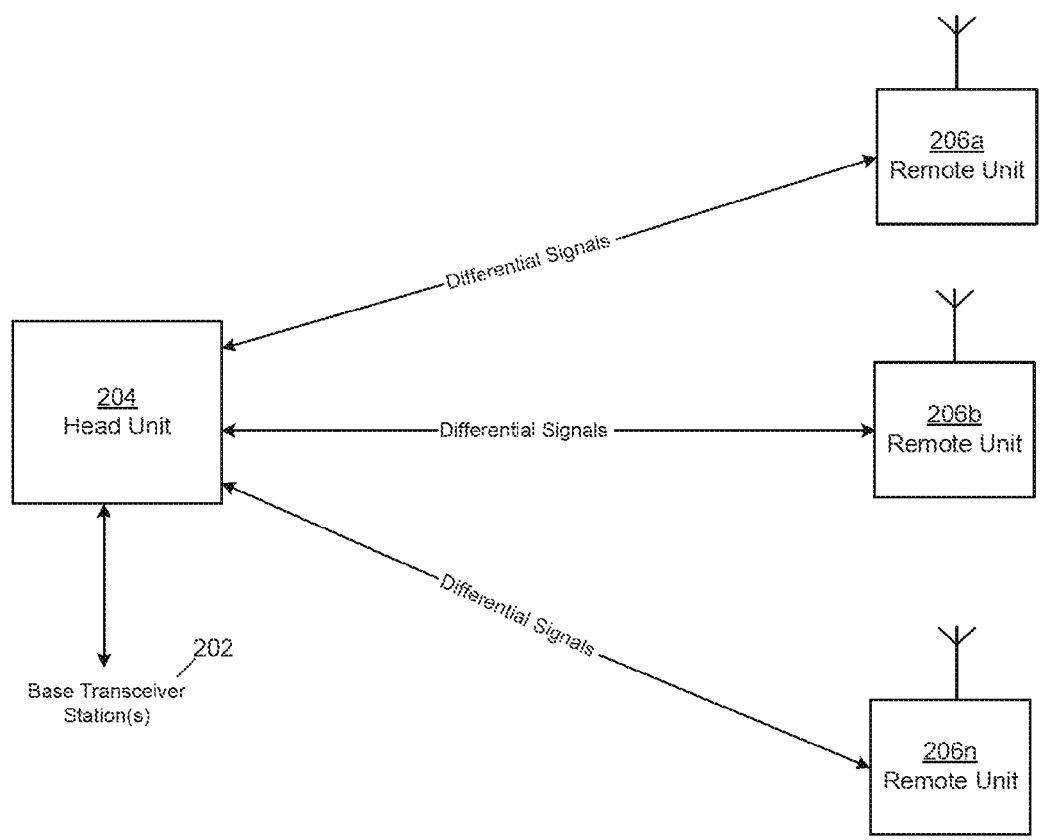
FIG. 2 is a block diagram of distributed antenna system for transporting differential signals according to one example.

FIG. 2 depicts an example of a DAS in communication with one or more base transceiver stations 202. The DAS includes a head unit 204 and remote units 206a-n. The DAS may be positioned in an area of low signal coverage, such as the interior of a building, to extend wireless communication coverage. Extending wireless coverage can include communicating signals between base transceiver stations 202 and wireless devices positioned in a coverage area of the DAS.

The head unit 204 can receive downlink signals from one or more base transceiver stations 202 via a wired or wireless communication medium. The head unit 204 can also provide uplink signals to the base transceiver stations 202.

The head unit 204 can determine differential signals from downlink signals, such as RF signals or standardized digital signals, received from the base transceiver stations 202. For example, the head unit 204 can include circuitry and/or one or more components that can digitize the RF signals, determine differential signals from the digitized RF signals, and prepare the differential signals for transport as, for example, digital data streams.

The head unit 204 can provide downlink digital data streams including differential signals to the remote units 206a-n directly over a communication medium that may be electrical wire, copper cable, such as coaxial cable, optical fiber, wireless, or other suitable communication medium, or indirectly via an extension unit (not shown). An extension unit can extend the range of the head unit 204.

The remote units 206a-n can estimate original digital signals from the differential signals and convert the estimated digital signals to RF for radiation using antennas to a number of different wireless devices, such as (but not limited to) cellular phones, operating in the environment of the DAS. In the uplink direction, the processing can be similar but reverse with each of the remote units 206a-n calculating differential signals that are transported to the head unit 204 and the head unit 204 estimates original signals from the differential signals and provides the estimated signals to the base transceiver station(s) 202.

Although the DAS is depicted as including one head unit 204 and three remote units 206a-n, any number (including one) of each can be used. For example, a DAS may include dozens of head units and hundreds of remote antenna units.

Figure 3:
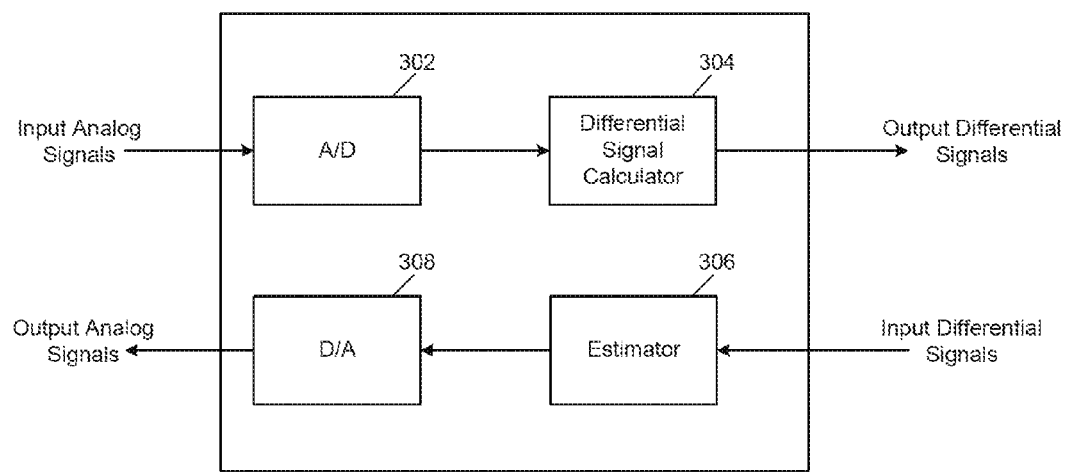
FIG. 3 is a block diagram of a unit for use in a system for transporting differential signals according to one example.

FIG. 3 depicts an example of a sub-system that can be included in a unit for processing differential signals. The sub-system includes an analog-to-digital (A/D) converter 302 and a differential signal calculator 304 in a first signal path. The sub-system includes an estimator 306 and a digital-to-analog (D/A) converter 308 in a second signal path that is in the opposite direction to the first signal path.

Figure 4:
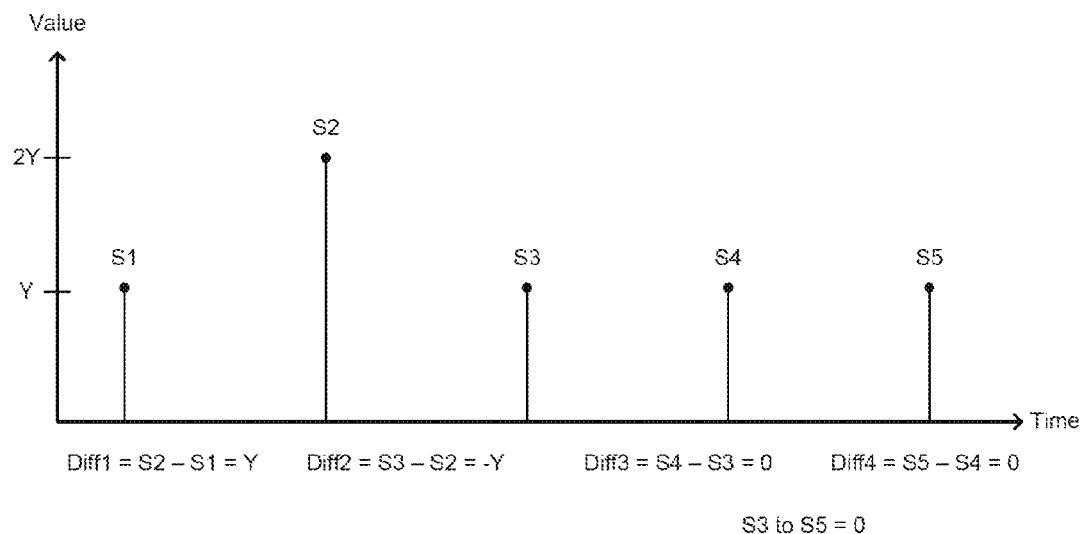
FIG. 4 is a chart illustrating differential signal determination according to one example.

The A/D converter 302 can digitize input analog signals to produce digital signals. Input analog signals may be received from wireless devices or base transceiver stations, for example. The differential signal calculator 304 can determine differential signals from the digital signals. Differential signals can include the difference in value between two digital samples. FIG. 4 depicts an example graph of samples (labeled S#) having certain values. The difference between sample S1 and sample S2 can be calculated by subtracting the value of S1 from the value of S2, which results in a difference of Y. The difference between the other samples can be calculated accordingly. Because the difference between samples S3 and S5 is zero, it may be possible to include just one value for the difference among those samples and an indicator as to the number of samples to which the difference applies in the differential signal to be transported.

Returning to FIG. 3, output differential signals can be provided from the sub-system for transport to another unit. Input differential signals can be received from another unit. An estimator 306 can estimate the original digital signal from the input differential signals. An estimate of the original signal can be created, for example, from the differential information by using earlier knowledge of the mean of the signal. Assume a discrete signal as $x=\{x(n)\}$, $n=0-\infty$. The differential value of the discrete signal at each sample point n can be calculated as follows: $\Delta x(n)=x(n)-x(n-1)$, $n=1-\infty$.

The value of any sample can be calculated from the initial value $x(0)$ and the sum of all previous differential values:

$$x(n) = x(0) + (x(1) - x(0)) + (x(2) - x(1)) \ldots + (x(n) - x(n-1))$$

$$x(n) = x(0) + \Delta x(1) + \Delta x(2) \ldots + \Delta x(n)$$

$$x(n) = x(0) + \sum_{n=1}^{n} \Delta x(n)$$

$\Delta x(n)$ can be calculated at one location and transmitted to another location. However, $x(0)$ is not transmitted and is unknown at the receiving location. x can be recreated at the receiving end.

First, $y(n)$ can be defined as the cumulative sum of $\Delta x(n)$ as follows:

$$y(n) = \sum_{k=1}^{n} \Delta x(k)$$

By substitution, x equals y plus a constant equal to $x(0)$, such that:

$$x(n)=y(n)+x(0), n=1-\infty$$

In some cases where x is a zero mean signal, then the mean of y is equal to $-x(0)$.

$$\text{mean}(x(n))=\text{mean}(y(n)+x(0)), n=1-\infty$$

$$\text{mean}(x(n))=\text{mean}(y(n))+\text{mean}(x(0)), n=1-\infty$$

$$\text{mean}(x(n))=\text{mean}(y(n))+x(0), n=1-\infty$$

$$0=\text{mean}(y(n))+x(0), n=1-\infty$$

$$\text{mean}(y(n))=-x(0), n=1-\infty$$

The mean of y can be estimated by various methods using an estimator. An example of an estimator is a single tap recursive lowpass filter, $\text{mean\_est}(n)=a \cdot y(n)+(1-a) \cdot \text{mean\_est}(n-1)$ where a may be very small.

To recreate $x(n)$ from $\Delta x(n)$, an estimate, statistically, of the mean of y can be used to estimate $x_1(0)$. An estimate can be an indication of the value of an unknown quantity based on observed data. An estimate may be the particular value of an estimator that is obtained from a particular sample of data and used to indicate the value of a parameter. An estimator may be any device that can calculate any quantity from the sample data that is used to give information about an unknown quantity in the sample population.

If the mean of y, $\bar{y}=-x(0)$, then the mean estimate of y, $\tilde{y}$, can be used to estimate the value of $-x(0)$. For example:

$$\hat{x}_1(n)=y(n)-\tilde{y}$$

The estimate of $x_m$ can become more accurate as the mean estimate more closely approximates the true mean. In the estimator, the smaller a becomes, the more accurate the sample mean can be.

The estimated original signals from the estimator 306 can be converted to analog signals by D/A converter 308. The analog signals can be provided as output analog signals, which may be provided, after further processing, to a base transceiver station or an antenna.

In some aspects, differential signals can be summed at a receive end. For example, the differential signals can be added, and the sample mean of the sum can be used to estimate the sum of the first samples. Two signals may be from two different locations (e.g., two different units) and represented as:

$$x_1=\{x_1(n)\}, n=0-\infty$$

$$x_2=\{x_2(n)\}, n=0-\infty$$

A summed signal can be created at another, third location, represented by:

$$z(n)=x_1(n)+x_2(n)$$

Because differential signals, rather than the signals themselves, are transported, the signals may not be added. The two signals $x_1$ and $x_2$ can be sensed at two different locations and differential signals, $\Delta x_1$ and $\Delta x_2$, can be calculated at each location. $\Delta x_1$ and $\Delta x_2$ can be transmitted to a third location over a communication medium and the sum $z(n)=x_1+x_2$ can be estimated as:

$$x_1(n) = x_1(0) + (x_1(1) - x_1(0)) + (x_1(2) - x_1(1)) \ldots + (x_1(n) - x_1(n-1))$$

$$x_2(n) = x_2(0) + (x_2(1) - x_2(0)) + (x_2(2) - x_2(1)) \ldots + (x_2(n) - x_2(n-1))$$

$$x_1(n) = x_1(0) + \Delta x_1(1) + \Delta x_1(2) \ldots + \Delta x_1(n)$$

$$x_2(n) = x_2(0) + \Delta x_2(1) + \Delta x_2(2) \ldots + \Delta x_2(n)$$

$$z(n) = x_1(n) + x_2(n)$$

$$z(n) = (x_1(0) + \Delta x_1(1) + \Delta x_1(2) \ldots + \Delta x_1(n) + x_2(n)) +$$

$$(x_2(0) + \Delta x_2(1) + \Delta x_2(2) \ldots + \Delta x_2(n))$$

$$z(n) = x_1(0) + x_2(0) + \sum_{n=1}^{n} (\Delta x_1(n) + \Delta x_2(n))$$

y can be defined as the cumulative sums of $\Delta x_1$ and $\Delta x_2$.

$$y(n) = \sum_{k=1}^{n} (\Delta x_1(k) + \Delta x_2(k))$$

Then:

$$z(n) = x_1(0) + x_2(0) + y(n)$$

$x_1(0)+x_2(0)$ may be unknown and, if $x_1$ and $x_2$ are zero mean signals then $x_1+x_2$ can be a zero mean signal. An estimate of the mean of y can be used to estimate $x_1(0)+x_2(0)$ and thus estimate $z(n)=x_1(n)+x_2(n)$.

$$\text{mean}(x_1(n)+x_2(n))=\text{mean}(y(n)+x_1(0)+x_2(0))$$

$$\text{mean}(x_1(n)+x_2(n))=\text{mean}(y(n))+\text{mean}(x_1(0)+x_2(0))$$

$$\text{mean}(x_1(n))=\text{mean}(y(n))+x_1(0)+x_2(0)$$

$$0=\text{mean}(y(n))+x_1(0)+x_2(0)$$

$$\text{mean}(y(n))=-(x_1(0)+x_2(0))$$

If $\tilde{y}$ is the mean estimate of y, then the mean estimate $\tilde{y}$ can be subtracted from $y(n)$ to estimate $z(n)$ as follows:

$$z(n)=x_1(0)+x_2(0)+y(n)$$

$$\hat{z}(n)=y(n)-\tilde{y}$$

Although the sum of two signals is described, any number of summed signals can be used.

Figure 5:
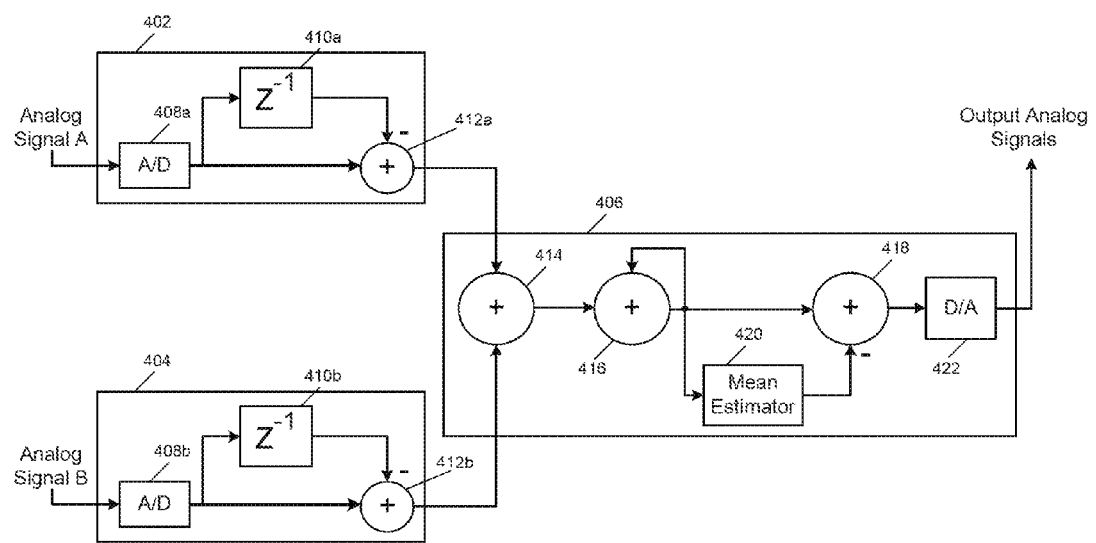
FIG. 5 is a schematic diagram of a system for transporting at least two differential signals according to one example.
Figure 6:
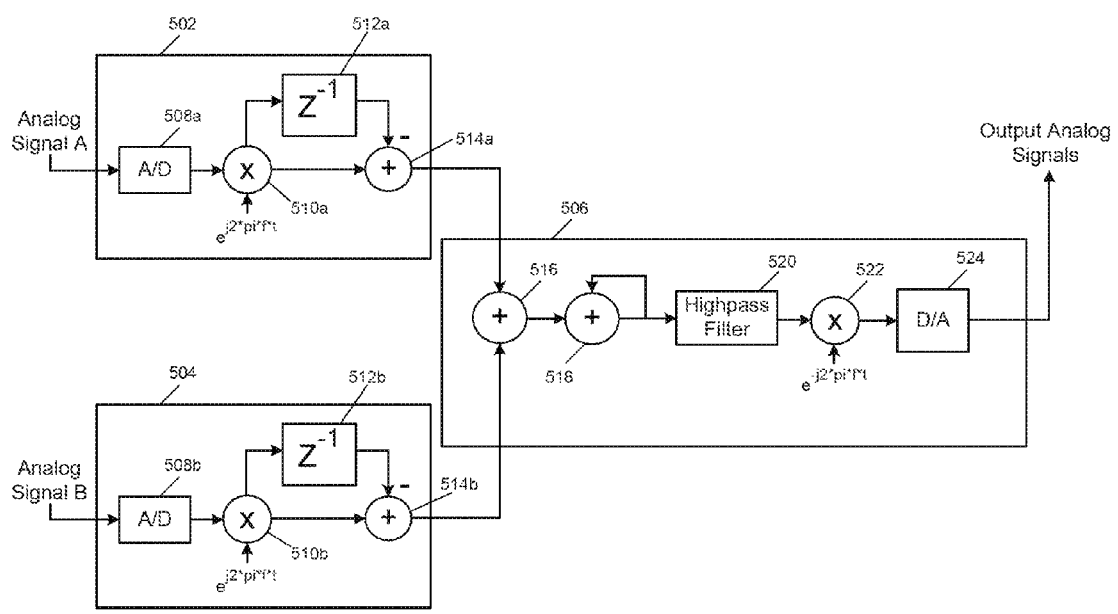
FIG. 6 is a schematic diagram of a system for transporting at least two differential signals according to another example.

FIGS. 5-6 depict examples of systems for summing transported differential signals. FIG. 5 depicts a first unit 402, a second unit 404, and a third unit 406 that can receive differential signals from the first unit 402 and the second unit 404. The first unit 402 includes an A/D converter 408a, a delay component 410a, and a summer 412a. The second unit 404 also includes an A/D converter 408b, a delay component 410b, and a summer 412b.

Analog signal A can be converted by the A/D converter 408a to a digital signal. Each sample of the digital signal can be provided to the delay component 410a and the summer 412a. The delay component 410a can hold a sample, change the value of the sample to an opposite sign, and then provide the sample with the opposite sign to the summer 412a in the next cycle for the value to be added to (or in effect subtracted from) the next sample. The process can produce differential signals that are provided to the third unit 406. The second unit 404 can produce second differential signals using a similar process and provide the second differential signals to the third unit 406.

The third unit 406 includes a summer 414 that can sum the differential signals, another summer 416 that can produce the cumulative sum of the summed differential signals, and a third summer 418 that can sum the cumulative sum with an estimated mean from a mean estimator 420 to produce an estimated sum of the original digital signals. The estimated sum of the original digital signals can be converted by a D/A converter 422 to output analog signals that are the estimated analog signals of the combination of analog signal A and analog signal B.

Errors in transmission of differential signals may corrupt estimated signals. The time constant can be made adaptive so that the decay factor is increased for some period of time to speed up the attack time of the recursive averager, and then reduced as the mean estimate converges, if an error is detected.

Systems according to certain aspects may be used to transmit a digitized band-limited signal. A complex mixer can be used to reduce the effect of bit errors by mixing the original signal such that the resulting spectrum at or near 0 Hz is in an area of the spectrum where there is no signal of interest. The term that is estimated is a constant; therefore, in the frequency domain this creates a signal at 0 Hz having a power that is proportional to the magnitude of the constant. Instead of calculating a mean estimate to remove the constant term, a filter can be used to remove this constant term without affecting the signal of interest. After the constant term is filtered off, another complex mixer with the opposite frequency shift can be applied to move the signal back to its original location in the frequency domain. The mixing operation can be performed before the filter, such as a filter that can filter out the constant converted to a CW tone at the mixing frequency.

FIG. 6 depicts an example of system using mixers. The system includes a first unit 502, a second unit 504, and a third unit 506. The first unit 502 includes an A/D converter 508a, a mixer 510a, a delay component 512a, and an adder 514a. The second unit also includes an A/D converter 508b, a mixer 510b, a delay component 512b, and an adder 514b.

An analog signal A can be converted to a digital signal by A/D converter 508a. The digital signal can be shifted by mixer 510a according to a frequency shift and provided to the delay component 512a and the adder 514a. The delay component 512a and the adder 514a can perform similar signal processing as in FIG. 5 to produce differential signals provided to the third unit 506. The second unit 504 can perform the same or similar processing on analog signal B to produce second differential signals provided to the third unit 506.

The third unit 506 includes a summer 516 for summing the differential signals received by the third unit 506. A second summer 518 can produce a cumulative sum of the summed differential signals. A highpass filter 520 can filter the cumulative sum and the signals are mixed by mixer 522 by a frequency shift of the opposite sign as that in mixers 510a-b to generate estimated summed digital signals. A D/A converter 524 can convert the estimated summed digital signals to estimated summed analog signals that are provided as output analog signals.

Although estimating signals using cumulative differences and sums is described, differentiation and integration of the signals can be used instead.

The foregoing description of the aspects, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A data compression method for digital radio frequency (RF) transport, the method comprising:
obtaining a plurality of samples of a first digital data stream at a first component of a digital RF transport system;
compressing the plurality of samples into a second digital data stream, where at least some of the samples of the second digital data stream is calculated as function of different samples of the first data stream;
transmitting the second digital data stream over a communication medium to a second component of the digital RF transport system;
at the second component of the digital RF transport system, estimating at least one statistical characteristic of the first digital data stream based on the second digital data stream;
generating a third digital data stream at the second component of the digital RF transport system as a function of the at least one statistical characteristic and the second digital data stream;
converting the third digital data stream into an analog RF signal; and
transmitting the analog RF signal from the second component of the digital RF transport system.

2. The method of claim 1, wherein estimating the at least one statistical characteristic of the first digital data stream based on the second digital data stream comprises estimating a mean value of the first digital data stream.

3. The method of claim 1, wherein compressing the plurality of samples into a second digital data stream comprises calculating a change in signal levels of the first digital data stream between constant time intervals.

4. The method of claim 1, wherein the communication medium comprises one of:
a wired communication medium; or
a wireless communication medium.

5. The method of claim 1, wherein the communication medium comprises one of:
a coaxial cable;
an electrical cable; or
an optical fiber.

6. The method of claim 1, further comprising:
sampling an original analog RF signal to obtain the plurality of samples of the first digital data stream at the first component of the digital RF transport system.

7. The method of claim 6, wherein the analog RF signal transmitted from the second component of the digital RF transport system is an estimate of the original analog RF signal sampled at the first component of the digital RF transport system.

8. The method of claim 1, wherein the third digital data stream generated at the second component of the digital RF transport system is further generated as a function of another digital data steam received from a third component of the digital RF transport system communicatively coupled to the second component of the digital RF transport system.

9. A digital radio frequency (RF) transport system, the system comprising:
a first component configured to obtain a plurality of samples of a first digital data stream and compress the plurality of samples into a second digital data stream, where at least some of the samples of the second digital data stream is calculated as function of a different samples of the first data stream;
a second component communicatively coupled to the first component by a communication medium, wherein the first component transmits the second digital data stream over the communication medium to the second component;
wherein the second component estimates at least one characteristic of the first digital data stream based on the second digital data stream and generates a third digital data stream as a function of the at least one characteristic and the second digital data stream;
wherein the second component is configured to convert the third digital data stream into an analog RF signal and transmit the analog RF signal from the second component.

10. The system of claim 9, wherein the at least one characteristic of the first digital data stream comprises a mean value of the first digital data stream.

11. The system of claim 9, wherein the first component compresses the plurality of samples into a second digital data stream by calculating a change in signal levels of the first digital data stream between constant time intervals.

12. The system of claim 9, wherein the communication medium comprises one of:
a wired communication medium; or
a wireless communication medium.

13. The system of claim 9, wherein the communication medium comprises one of:
   a coaxial cable;
   an electrical cable; or
   an optical fiber.

14. The system of claim 9, further comprising:
   wherein the first component of the digital RF transport system comprises at least one analog-to-digital converter to sample an original analog RF signal to obtain the plurality of samples of the first digital data stream at the first component of the digital RF transport system.

15. The system, of claim 14, wherein the analog RF signal transmitted from the second component of the digital RF transport system is an estimate of the original analog RF signal sampled at the first component of a digital RF transport system.

16. The system of claim 9, wherein the third digital data stream at the second component of the digital RF transport system is further generated as a function of another digital data steam received from a third component of the digital RF transport system coupled to the second component of the digital RF transport system.

\* \* \* \* \*